G. J. Wardwell,
Sawing Stone.
N° 16,033.    Patented Nov. 4, 1856.
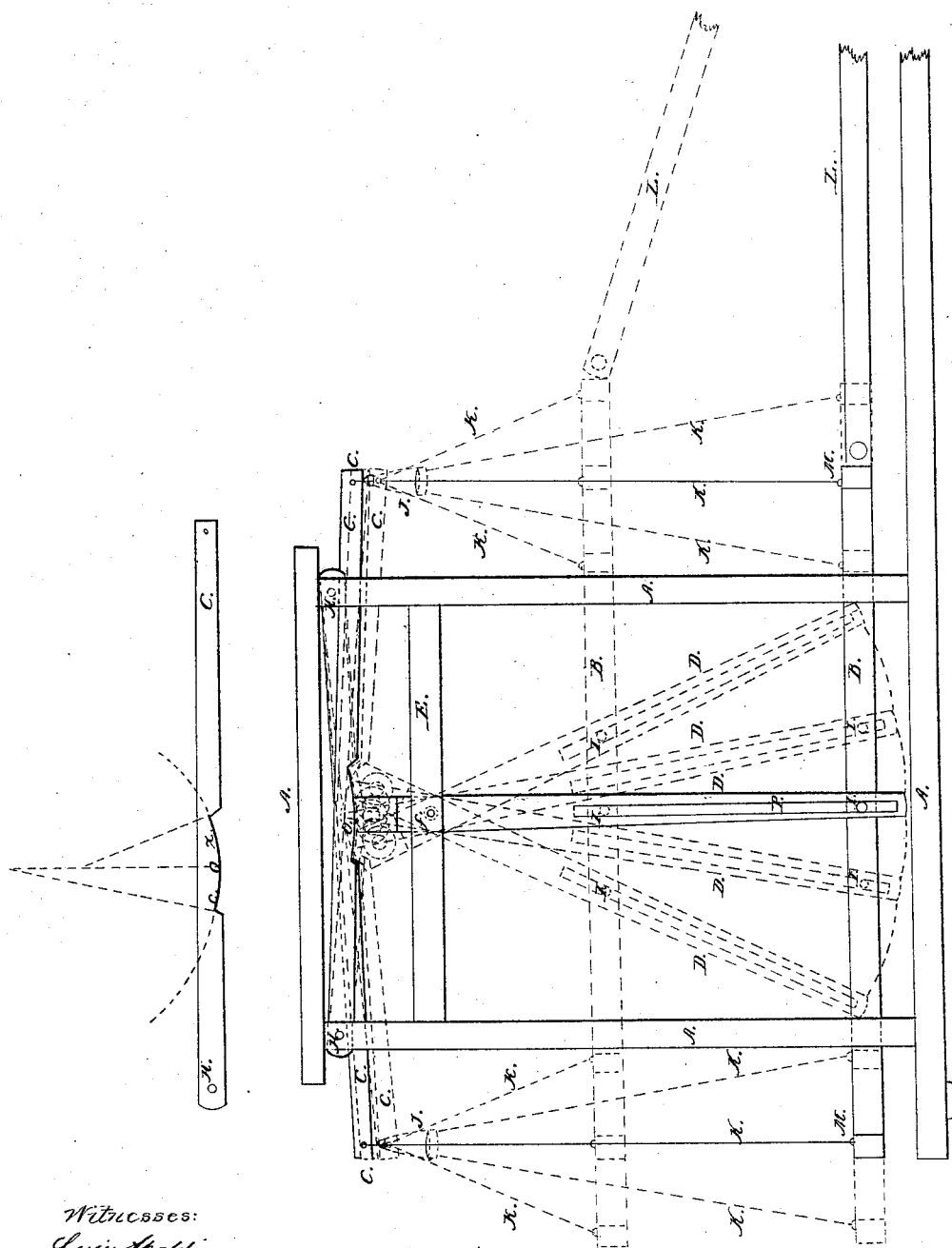
Witnesses:
Levi Spalding
A. B. Crockett
Inventor:
Geo. J. Wardwell

UNITED STATES PATENT OFFICE.

GEO. J. WARDWELL, OF HATLEY, CANADA WEST.

MACHINE FOR SAWING MARBLE AND STONE.

Specification of Letters Patent No. 16,033, dated November 4, 1856.

*To all whom it may concern:*

Be it known that I, GEO. J. WARDWELL, formerly of Andover, in the county of Oxford and State of Maine, but now of Hatley, county of Stanstead, district of St. Francis, and Province of Canada, have invented a new and useful Improvement on Machines for Sawing Marble and Stone; and I do hereby declare that the following is a full and exact description of the same, reference being had to the accompanying drawings and to the letters of reference marked thereon.

Of the said drawings Figure 1 represents a side elevation of a machine with my improvement attached, both sides being constructed alike. Fig. 2 represents one of the levers from which the saw frame is suspended.

The nature of my invention consists in suspending the swinging saw frame for sawing marble and stone, from what I term cross levers, arranged horizontally and attached to the upper part of the stationary frame. These levers also rest on friction rollers attached to the top end of vertical levers, which vibrate on a pin attached to cross girts situated below the horizontal levers. The lower part of the vertical levers are attached to and swing with the swinging saw frame, for the purpose of compensating in part or whole for the rising of the swinging saw frame as it swings each way from the center of its stroke, thereby allowing the saws to remain in the cut the whole or a greater part of its stroke.

To enable others skilled in the art to make and use my invention I will proceed to describe its construction and operation.

A represents the stationary frame of the machine, the upright pieces serving as side guides for the swinging saw frame B in the usual manner. The swinging saw frame is constructed in the usual manner.

K K are cords, one end of each being attached to and support the swinging saw frame. The other ends of these cords pass over or through one end of each of the cross levers C C with weights J J attached for balancing the swinging saw frame.

E is a cross girt situated below the cross levers, to which is attached a pin *f* on which the lever D carrying a friction roller G on its top end, vibrates. One end of each of the cross levers C C moves on a pin H attached to the stationary frame. The said cross levers have on their lower edges circular bearing surfaces O, which surfaces rest on the friction roller G attached to the top end of the vertical lever D. Said circular bearing surfaces are described by parts of two circles *e*, *x*, which unite directly over the pin on which the vertical lever vibrates, the smaller circle *x* being farther from and the larger circle *e* nearer to the pin on which the cross levers move, as shown in Fig. 2, for the purpose of allowing the cross levers with the cords and weights to fall and rise equally, thereby causing the swinging saw frame to receive a straight motion. The cross levers C C, constructed with straight instead of circular bearing surfaces, will partially produce the desired effect of keeping the saws longer in the cut.

The vertical lever D has a slot P in its lower part running lengthwise. Said lever is attached to and swings with the saw frame by means of the pin I, which pin is allowed to move in the slot while the saws are operating at any required elevation.

L is a pitman through which the power is applied to the machine.

Fig. 1 represents the swinging saw frame B as being at the middle of its stroke.

The operation of the machine is as follows: The vibration of the saw frame B carrying the pin or pins I causes the lever or levers D with its friction roller or rollers G to swing with it, the friction roller or rollers G are thereby made to pass over the circular bearing surfaces O of the cross lever or levers C C allowing them with the cords K K and weights J J to fall when the saw frame B swings from and rise when it swings toward the center of its stroke, thereby giving the saw frame B a straight motion and allowing the saws to remain in the cut the whole or a greater part of its stroke.

The position of the levers, cords and saw frame are shown in red at each end of the stroke, when the saws are working at their lowest elevation, and the position of the same is also shown in blue at their highest elevation. The advantage gained by this arrangement over the old method is, that the saws are allowed to remain in the cut a longer part of the stroke, thereby accomplishing a greater amount of work in the same time.

What I claim as my invention and desire to secure by Letters Patent is—

Suspending the swinging saw frame B from levers C C when arranged as described, and constructed with or without the circular bearing surface O, resting on the friction roller or rollers G, in the end of the vertical lever or levers D attached to and swinging with the swinging saw frame B, the whole being arranged in the manner and for the purpose specified.

GEO. J. WARDWELL.

Witnesses:
LEVI SPALDING,
N. B. CROCKETT.